(12) United States Patent
Denk et al.

(10) Patent No.: US 11,138,424 B2
(45) Date of Patent: Oct. 5, 2021

(54) CONTEXTUAL VECTOR GRIDS FOR DOCUMENT PROCESSING

(71) Applicant: SAP SE, Walldorf (DE)

(72) Inventors: Timo Denk, Berlin (DE); Christian Reisswig, Berlin (DE)

(73) Assignee: SAP SE, Walldorf (DE)

(*) Notice: Subject to any disclaimer, the term of this patent is extended or adjusted under 35 U.S.C. 154(b) by 37 days.

(21) Appl. No.: 16/689,516

(22) Filed: Nov. 20, 2019

(65) Prior Publication Data
US 2021/0150202 A1    May 20, 2021

(51) Int. Cl.
| | | |
|---|---|---|
| G06K 9/00 | (2006.01) | |
| G06T 7/70 | (2017.01) | |
| G06K 9/72 | (2006.01) | |

(52) U.S. Cl.
CPC ......... *G06K 9/00463* (2013.01); *G06K 9/726* (2013.01); *G06T 7/70* (2017.01); *G06K 2209/01* (2013.01); *G06T 2207/20084* (2013.01); *G06T 2207/30176* (2013.01)

(58) Field of Classification Search
CPC .............. G06K 9/00463; G06K 9/726; G06K 2209/01; G06T 7/70; G06T 2207/20084; G06T 2207/30176
See application file for complete search history.

(56) References Cited

U.S. PATENT DOCUMENTS

| | | | |
|---|---|---|---|
| 9,396,540 B1* | 7/2016 | Sampson | G06F 16/355 |
| 2014/0363074 A1* | 12/2014 | Dolfing | G06K 9/6821 |
| | | | 382/156 |
| 2015/0215653 A1* | 7/2015 | Hiratsuka | G06F 40/109 |
| | | | 382/239 |
| 2020/0327172 A1* | 10/2020 | Coquard | G06F 16/906 |

OTHER PUBLICATIONS

Devlin, J. et al., "BERT: Pre-training of Deep Bidirectional Transformers for Language Understanding," available at https://arxiv.org/pdf/1810.04805.pdf, 16 pages, May 24, 2019.

Katti, A.R. et al., "Chargrid: Towards Understanding 2D Documents." Proceedings of the 2018 Conference on Empirical Methods in Natural Language Processing, pp. 4459-4469, Oct. 31-Nov. 4, 2018.

Vaswani, A. et al., "Attention is All You Need," available at https://arxiv.org/pdf/1706.03762.pdf, 15 pages, Dec. 6, 2017.

* cited by examiner

*Primary Examiner* — Syed Haider
(74) *Attorney, Agent, or Firm* — Sterne, Kessler, Goldstein & Fox P.L.L.C.

(57) ABSTRACT

Disclosed herein are system, method, and computer program product embodiments for analyzing contextual symbol information for document processing. In an embodiment, a language model system may generate a vector grid that incorporates contextual document information. The language model system may receive a document file and identify symbols of the document file to generate a symbol grid. The language model system may also identify position parameters corresponding to each of the symbols. The language model system may then analyze the symbols using an embedding function and neighboring symbols to determine contextual vector values corresponding to each of the symbols. The language model system may then generate a vector grid mapping the contextual vector values using the position parameters. The contextual information from the vector grid may provide increase document processing accuracy as well as faster processing convergence.

20 Claims, 5 Drawing Sheets

CONTEXTUAL VECTOR GRIDS FOR DOCUMENT PROCESSING

BACKGROUND

Optical character recognition (OCR) has been used to identify characters in documents. Further, machine learning algorithms have been developed to identify characters and words within images of documents based on applied OCR techniques. For example, characters, words, or symbols may be extracted from an image of a document. These techniques, however, do not provide semantic meaning to these identified symbols. Similarly, identifying characters from document data files may also fail to provide semantic meaning. For example, these techniques do not consider the context of a symbol relative to other symbols in the document. The lack of this information may introduce difficulties in analyzing the content of the document beyond simple characters and words. In particular, further computer-based document analysis may be inaccurate and/or yield incorrect results.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for generating a vector grid providing contextual document information. The embodiments disclosed herein may analyze a document file to identify symbol and position parameters corresponding to the two-dimensional (2D) layout of the document. The document file may be a document data file and/or an image of a document. The symbols may be analyzed using an embedding function and language model artificial intelligence to identify contextual vector values. A vector grid may then be constructed by mapping the vector values. The vector grid may include contextual information, such as which symbols or words are positioned next to a particular symbol or word. This contextual information may aid in identifying semantic information related to the particular symbol and/or other portions of the document. This vector grid may then be used by a downstream processing system to perform additional document processing using the symbol and context information.

In an embodiment, a language model system may generate the vector grid. The language model system may include an optical character recognition (OCR) system or may receive the output values from an external OCR system. For example, an OCR process may be applied to an image of a document. For example, the document image may be a scanned document, a PDF document, a photograph, and/or a picture of a document. The OCR process may identify symbol values and/or coordinate position values for symbols of the document image. Depending on the configuration of the OCR system, the language model system, and/or a downstream document processing system, the symbols may be individual characters and/or groups of characters such as words, phrases, sentences, or other character groupings. The OCR process may then assign a symbol value to each identified symbol. Using the positional values, the language model system may generate a symbol grid mapping the symbol values to positions on the document. The positions may be absolute positions and/or relative positions.

In some embodiments, the language model system may analyze a document file that may be a data file containing formatted text such as, for example, HTML, Word text, plain text, formatted text, and/or other text data files. In this case, the language model system may avoid an OCR process and identify the text and/or positional information directly from the document data file. For example, the language model system may use a file reader or converter. In this manner, the language model system may identify the characters, symbols, and/or corresponding positions without applying an OCR technique. While this disclosure describes the analysis of a document file, the description of a document file may include an analysis of other document data files, document images, and/or images of documents.

After identifying symbols and position information of a document file, the language model system may then apply a language model to the symbols to generate contextual vector values. When generating the contextual vector values, the language model system may identify contextual values such as neighboring symbols. These neighboring symbols may provide contextual details that aid in identifying semantic information for each symbol. To illustrate an example embodiment, a document file may include the sentence "Date: May 22, 2019: May I call you?" If the symbols are identified as words, the symbol "May" appears twice in this sentence, but each instance includes a different connotation. In particular, the first instance of "May" refers to the month in a date while the second instance references a request of permission. In this example, while both symbols are the same, the connotations and semantic meanings are different.

To capture the differences in these semantic meanings, the language model system may utilize the neighboring symbols to provide contextual information. For example, the language model system may consider different radiuses of neighboring symbols when determining how many symbols to consider. In the example embodiment, the contextual symbols may include the symbol preceding and the symbol following the particular symbol. For the first instance of "May", the context may be the symbols "Date:" and "22". For the second instance of "May", the context may be the symbols "2019:" and "I". The symbols may or may not incorporate punctuations.

Using these contextual symbols, the language model system may generate contextual vector values for each symbol. The contextual vector values may differentiate the symbols based on their contextual information. To generate these values, the language model system may apply a language model and/or another machine learning or artificial intelligence process that identifies a symbol, position parameters such as a horizontal and/or vertical position, and/or contextual symbol information. The language model may use an embedding function that processes this information, including the contextual symbol information, to provide a contextual vector value for the symbol. As will be further explained below, in an embodiment, the language model system may use a Bidirectional Encoder Representations from Transformers (BERT) model to generate contextual vector values.

After determining the contextual vector values, the language model system may generate a vector grid using the contextual vector values. The vector grid may include the contextual vector values positioned based on the position parameters corresponding to the original symbols. Using the vector grid, downstream processing systems may identify positional information as well as contextual information when performing document analysis. A downstream processing system may include document identification, identifying portions of a document, semantic extraction, key value extraction, and/or other computer-based document analysis.

The vector grid includes embeddings for symbols that provide additional semantic meaning which may aid downstream artificial intelligence and/or machine learning systems in generating more accurate results. Further, the vector grid may be able to utilize unlabeled datasets during a pre-training procedure. These elements may lead to better performance as well as faster convergence on downstream tasks. By providing a grid representation as well as contextual information, the vector grid may be used in conjunction with or incorporated into document processing systems to improve accuracy and processing speeds.

Various embodiments of these features will now be discussed with respect to the corresponding figures.

Figure 1A:
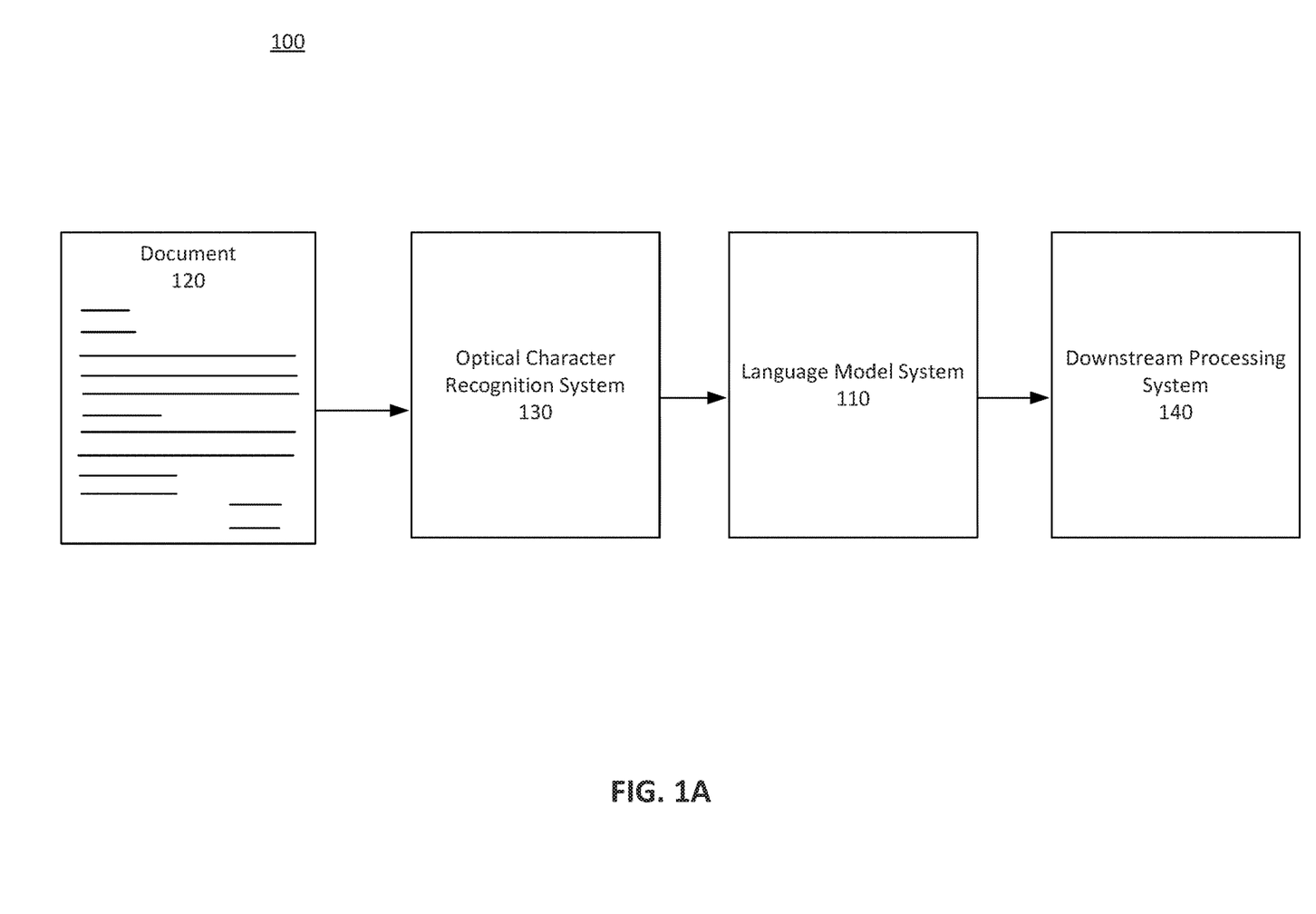
FIG. 1A depicts a block diagram of a document processing environment, according to some embodiments.

FIG. 1A depicts a block diagram of a document processing environment 100, according to some embodiments. Document processing environment 100 may include language model system 110, optical character recognition (OCR) system 130, downstream processing system 140, and document 120. Document 120 may include handwritten and/or typewritten text. Document 120 may be an image of a document and/or other type of data file having characters that may be identified. Document 120 may be a scanned document, a PDF document, a photograph, and/or an image of a document. In some embodiments, document 120 may be a data file containing formatted text such as, for example, HTML, Word text, plain text, formatted text, and/or other text data files. Document 120 may include characters and/or groupings of characters. The characters may be spatially arranged, such as, for example, according to a document layout. In some embodiments, document 120 may include different languages and/or symbols representing different alphabets.

OCR system 130 may identify text, characters, and/or symbols from document 120. OCR system 130 may apply sequential optical character recognition techniques and/or use artificial intelligence such as a neural network to identify characters of document 120. In an embodiment, identifying text, characters, and/or symbols may include assigning a numeric value to a pixel area on document 120. The numeric value may represent an index value identifying the pixel area as a particular character or symbol.

OCR system 130 may analyze document 120 to extract, for example, a 1D sequence of characters. In an embodiment, OCR system 130 may extract string information and/or position information related to the characters of document 120. In an embodiment, document 120 may include 2D layout information and/or metadata. OCR system 130 may identify this metadata when scanning document 120. OCR system 130 may identify the position of characters using OCR techniques even if document 120 does not include metadata. OCR system 130 may be a system that uses one or more processors and/or the computer system described with reference to FIG. 4. OCR system 130 may be a system external to language model system 110. As will be further described with reference to FIG. 1B, elements from OCR system 130 may be incorporated in language model system 110 and/or share common hardware with language model system 110.

As will be further described with reference to FIG. 1B, using the information derived by OCR system 130, language model system 110 may generate a symbol grid and/or a vector grid. FIG. 2 depicts a block diagram of a symbol grid 210 and a vector grid 220, according to some embodiments that will be further described below. The symbol grid may represent a down-sampled version of document 120. The symbol grid may comprise grid cells corresponding to the characters of document 120. The grid cells may group characters depending on the configuration and/or training of language model system 110. For example, the grid cells may groups characters into words, phrases, sentences, paragraphs, and/or other character groupings. In some embodiments, the grid cells may group individual characters. Based on the grouping performed by language model system 110, each grid cell may include a symbol. In some embodiments, each symbol may correspond to a grid cell of the symbol grid.

As previously explained, language model system 110 may also analyze data files including text. For example, document 120 may be HTML, Word text, plain text, formatted text, and/or other text data files. In this case, language model system 110 may directly analyze the data files to identify symbols and/or corresponding positions without performing an OCR process. For example, language model system 110 may process document 120 without receiving an output from OCR system 130.

FIG. 2, depicts an example embodiment of a symbol grid 210 and a vector grid 220. Symbol grid 210 and vector grid 220 may correspond to textual characters from document 120. For example, document 120 may include characters organized into lines. Document 120 may include the lines:

"Date: May 22, 2019: May I call you?"
"More text"
"Even more text here"

The characters from these lines may be identified by OCR system 130 when document 120 is an image of a document. In some embodiments, the characters may have been included in a document data file such that language model system 110 may analyze the characters without application of OCR system 130. Language model system 110 may then generate symbol grid 210 based on the identified characters. For example, as seen in FIG. 2, language model system 110 may generate grid cells based on the grouping of characters into words. Language model system 110 may identify these groupings based on blank or empty spaces between groups of characters and/or based on punctuations. In this manner, depending on the configuration and/or training, language model system 110 may identify symbols from document 120. Language model system 110 may then associate the symbol with a grid cell and/or a particular position parameter. The position parameter may be an absolute and/or relative position for each grid cell. The collective grid cells may compose symbol grid 210.

As seen in symbol grid 210, the symbols identified by language model system 110 may correspond to words but may also correspond to words with punctuation. This grouping to determine the symbols may occur based on the spacing between groups of characters. For example, a symbol may be "Date:" while other symbols may be "May"; "22"; or "2019:". In some embodiments, blank space may be identified as a blank symbol or may be ignored as null spaces.

As previously described, multiple instances of the same symbol may exist in document 120 and/or symbol grid 210, but the instances may be associated with different semantic meanings. For example, the symbol "May" appears twice in symbol grid 210, but each instance includes a different connotation. The first instance of "May" refers to the month in a date while the second instance references a request of permission. In this example, while both symbols are the same, the connotations and semantic meanings are different.

To capture the differences in these semantic meanings, language model system 110 may utilize the neighboring symbols to provide contextual information. For example, language model system 110 may consider different radii of neighboring symbols when determining which symbols to consider. For symbol grid 210, the contextual symbols may include the symbol preceding and the symbol following the particular symbol. For the first instance of "May", the context may be the symbols "Date:" and "22". For the second instance of "May", the context may be the symbols "2019:" and "I". The symbols may or may not incorporate punctuations.

As will be further described with reference to FIG. 1B, language model system 110 may perform this analysis using an artificial intelligence language model trained to generate vector values incorporating the contextual symbol information. The language model and/or another machine learning or artificial intelligence process may identify a symbol, position parameters such as a horizontal and/or vertical position of the symbol, and/or contextual symbol information. The language model may use an embedding function that processes this information, including the contextual symbol information, to provide a contextual vector value for the symbol. In an embodiment, the language model system may use a Bidirectional Encoder Representations from Transformers (BERT) model to generate contextual vector values.

Upon generating contextual vector values for the symbols from symbol grid 210, language model system 110 may generate vector grid 220. Vector grid 220 may be the output of the application of the language model. Vector grid 220 may identify a vector for each symbol where the vector identifies the context and surrounding symbol information for a particular symbol. For example, as seen from the two instances of the symbol "May" from symbol grid 210, different vector values may be identified to represent different contextual information for each instance of the "May" symbol. Similarly, for the symbol "text" as seen from symbol grid 210, the corresponding vector values may differ based on the surrounding contextual information for each instance. Language model system 110 may then generate vector grid 220. Vector grid 220 may map the contextual vector value using the position parameters of the symbols to generate a grid representation.

After generating vector grid 220, language model system 110 may transmit the vector grid 220 to downstream processing system 140. Downstream processing system 140 may be a system that uses vector grid 220 to perform additional document processing. For example, downstream processing system 140 may perform document classification, data extraction, key value extraction, and/or other document analysis. Downstream processing system 140 may utilize the contextual information to determine semantic information. For example, downstream processing system 140 may determine the tone of document 120. In an embodiment, downstream processing system 140 may use a neural network and/or other artificial intelligence to process vector grid 220. Downstream processing system 140 may be a system external to language model system 110.

In some embodiments, downstream processing system 140 may be implemented using shared hardware with language model system 110. For example, language model system 110 may use vector grid 220 to perform additional document processing depending on the task specified and the configuration of the neural network. Downstream processing system 140 and language model system 110 may utilize common processors and/or memory to perform the vector grid generation and processing. Language model system 110 may implement an end-to-end neural network to perform the vector grid 220 generation as well as the document processing. Components of language model system 110 will now be described further with reference to FIG. 1B.

Figure 1B:
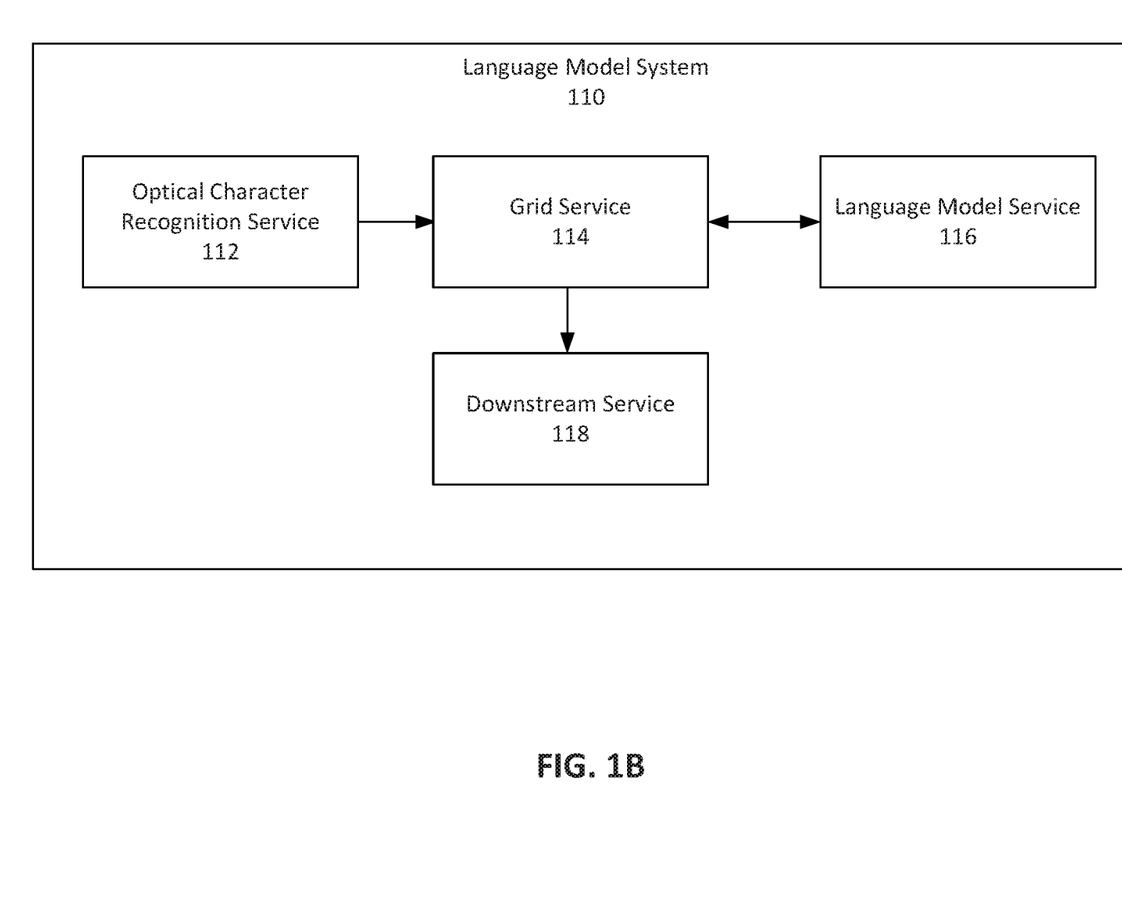
FIG. 1B depicts a block diagram of a language model system, according to some embodiments.
Figure 2:
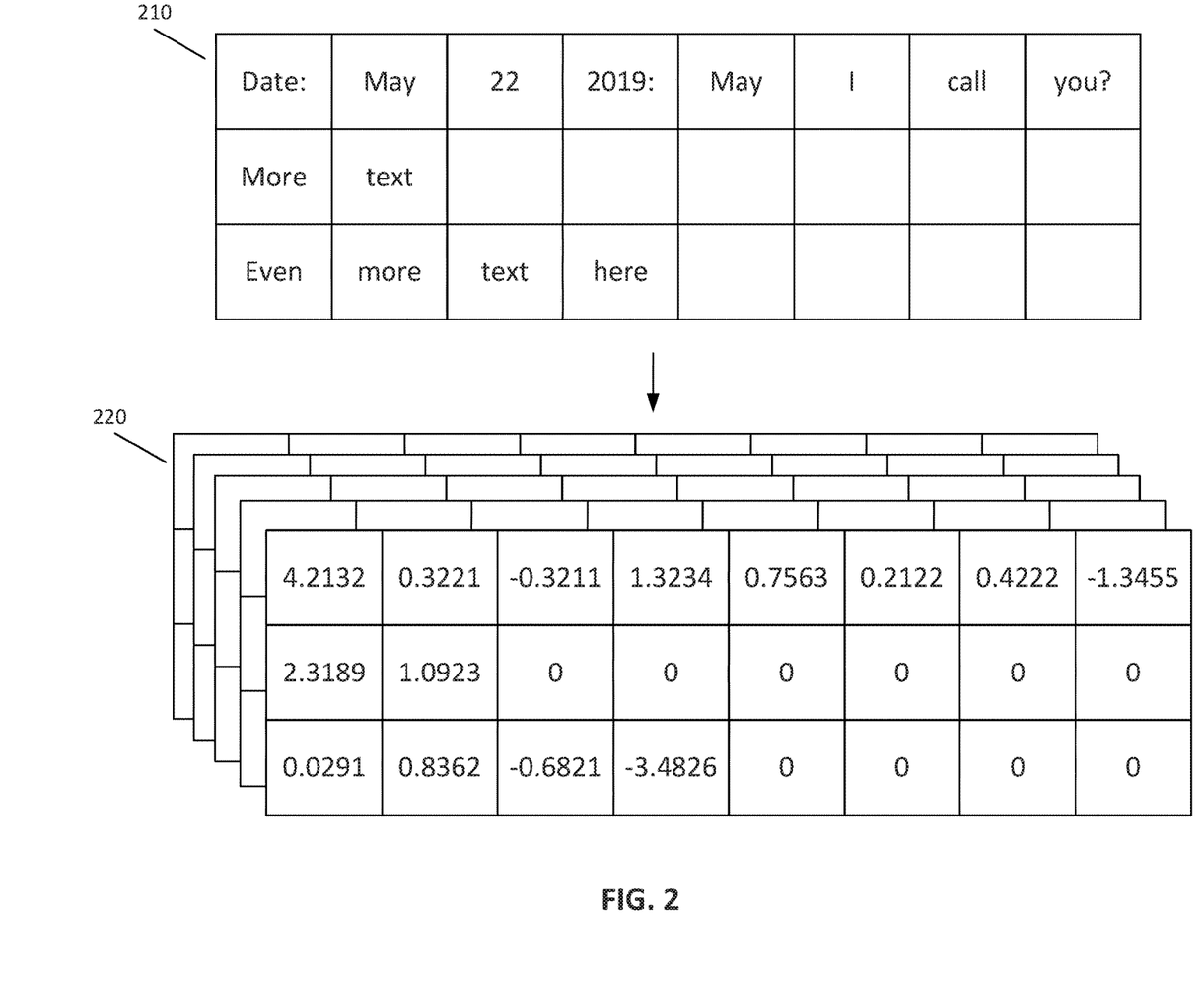
FIG. 2 depicts a block diagram of a symbol grid and a vector grid, according to some embodiments.

FIG. 1B depicts a block diagram of language model system 110, according to some embodiments. Language model system 110 may analyze a document similar to document 120 described with reference to FIG. 1A to generate a vector grid similar to vector grid 220 as described with reference to FIG. 2. Language model system 110 may utilize one or more processors and/or memory to Language model system 110 may include optical character recognition (OCR) service 112, grid service 114, language model service 116, and/or downstream service 118.

In some embodiments, OCR service 112 may operate in a manner similar to OCR system 130 as described with reference to FIG. 1A. While FIG. 1A depicts OCR system 130 as a separate system from language model system 110, language model system 110 as depicted in FIG. 1B may perform the OCR processing internally. In this manner, language model system 110 may identify symbols and/or symbol position parameters from document 120 even if an external OCR system 130 is unavailable. Using the symbol values and the position parameters, grid service 114 may generate symbol grid 210 as depicted in FIG. 2. In an embodiment where document 120 is a data file including text and positioning information, language model system 110 may avoid using OCR service 112. Language model system 110 may use a reader or converter to extract the text and/or positional information from the file. Language model system 110 may use this information to generate symbol grid 210.

Grid service 114 may be executed by a processor of language model system 110. Grid service 114 may manage the position parameters and/or the symbol parameters. Grid service 114 may form symbol grid 210 and utilize language model service 116 to generate vector grid 220.

Language model service 116 may use a language model to apply an embedding function to the symbols to determine contextual vector values. These contextual vector values may incorporate contextual information for each of the symbols identified in symbol grid 210. To generate the contextual vector values, language model service 116 may apply an embedding function to each symbol. The embedding function may use the symbol value, position parameters of the symbol, and contextual information as inputs to determine a contextual vector value for the particular symbol. The embedding function may be represented as:

Contextual vector value=e (s, x, y, c)

where "e" represents the embedding function, "s" represents the symbol or symbol value, "x" and "y" represent position parameters of the symbol, and "c" represents the context of the symbol. The symbol or symbol value may be a numeric value representing the symbol. For example, the symbol may be identified using a numeric index. The position parameters may represent a horizontal and/or vertical value indicating the position of the symbol on document 120. The position parameters may be spatial coordinates. In some embodiments, the position parameters may indicate a position of the symbol in symbol grid 210. The position parameters may be absolute or relative coordinates.

The context may be a set of neighboring symbols or symbol values. In the symbol grid 210, the context may be the set of symbols within a certain radius around the particular symbol position x, y. Language model service 116 may be configured to use different radius values depending on the amount of contextual information desired to be incorporated into the contextual vector values. Using this contextual information, language model service 116 may provide additional expressive information for determining semantic information of an analyzed document.

To illustrate an example embodiment, a sentence of document 120 may be "Date: May 22, 2019: May I call you?" With a radius value of one symbol, the embedding function as applied to the first instance of "May" may be:

e ("May", 2, 1, ["Date", "22,"])

In this case, the symbol may be "May" with the x-coordinate being "2", the y-coordinate being "1", and the context being the symbols ["Date", "22,"]. With a different radius value, additional contextual symbols may be included. Using this contextual symbol information, a contextual vector value may be generated using the embedding function of language model service 116.

The embedding function as applied to the second instance of the symbol "May" may be:

e ("May", 5, 1, ["2019", "I"])

in this case, the symbol may be the same "May", but the x-coordinate differs as "5" and the context differs as ["2019", "I"].

The embedding function may be applied to both symbols but may return different results as contextual vector values depending on the context and/or position of the symbols. In this manner, language model service 116 may generate contextual values differentiating between the two instances of the symbol. The embedding function may be applied to the symbols of symbol grid 210 to generate contextual vector values and vector grid 220.

The embedding function utilized by language model service 116 may be a neural network and/or other artificial intelligence configured to identify contextual vector values. The neural network may be trained using training data to identify coefficients for the embedding function. In some embodiments, the neural network may be trained based on the operations to be performed by downstream processing system 140. For example, if downstream processing system 140 is configured to extract values and/or symbols from document 120 or classify document 120, the embedding function may be trained to aid in this analysis.

In an embodiment, the embedding function may be implemented using a language model such as the Bidirectional Encoder Representations from Transformers (BERT) model. The BERT model may be trained to predict masked words or symbols in a given sequence of symbols. The BERT model may accept a sequence of symbols or words and then replace each symbol with a special MASK symbol. The BERT model may then compute a probability distribution over the possible symbols with a peak in the probability distribution at the original symbol. This symbol may be in the original location of the MASK symbol. To compute this probability distribution, the BERT model may consider the neighboring symbols and the context of a particular symbol.

The BERT model may use several layers of representations or layer activations to approximate or select a probability distribution for a masked symbol from the context. The layer activations may be vectors that include semantic information about symbols. For example, the semantic information may provide details related to words in a sentence.

To generate the contextual vector values, the BERT model or another language model may be trained using a document dataset. The document dataset may be from the same domain as the downstream task performed by downstream processing system 140. In some documents, the document dataset may include other documents. In some embodiments, the training of the language model may be unsupervised and/or may not require labeled documents. This training may occur prior to the processing and analysis of document 120.

After training the language model, language model service 116 may apply the language model to document 120. Language model service 116 may apply the embedding function based on a sequential input constructed from the contextual information where each symbol is masked. The language model is then evaluated and a layer activation for the masked symbol is selected for the return value of the embedding function as the contextual vector value. In an embodiment, the return value may be a layer activation of the masked symbol close to the output layer. This language model process may be applied to each symbol to identify corresponding contextual vector values.

After generating the contextual vector values, language model service 116 may pass these values to grid service 114. Grid service 114 may correlate the contextual vector values with the positional parameters to generate vector grid 220. Grid service 114 may pass vector grid 220 to downstream service 118, which may be used to transmit vector grid 220 to downstream processing system 140. Downstream service 118 may use a wired or wireless communications protocol to transmit vector grid 220. As described above, in some embodiments, the downstream processing of vector grid 220 may occur at language model system 110. In this case, downstream service 118 may perform the downstream processing task for analyzing document 120. For example, downstream service 118 may perform key value extraction and/or document classification.

As previously explained, the generation of vector grid 220 from document 120 provides semantically more meaningful context relative to symbol values alone. The structure of vector grid 220 may provide increased accuracy to downstream processing system 140 and/or allow for faster convergence in processing downstream tasks. The two-dimensional layout combined with contextual information may provide additional information for downstream document processing. Further, the training of a language model may also be performed using unlabeled datasets. This training may remove the requirement for labeled documents with special metadata to perform the training. This training may also be performed on sequential or one-dimensional language models. In this manner, the training of the language model may be flexible and/or adaptable to labeled and/or unlabeled datasets. This may provide higher accuracy with fewer training samples as well.

Figure 3:
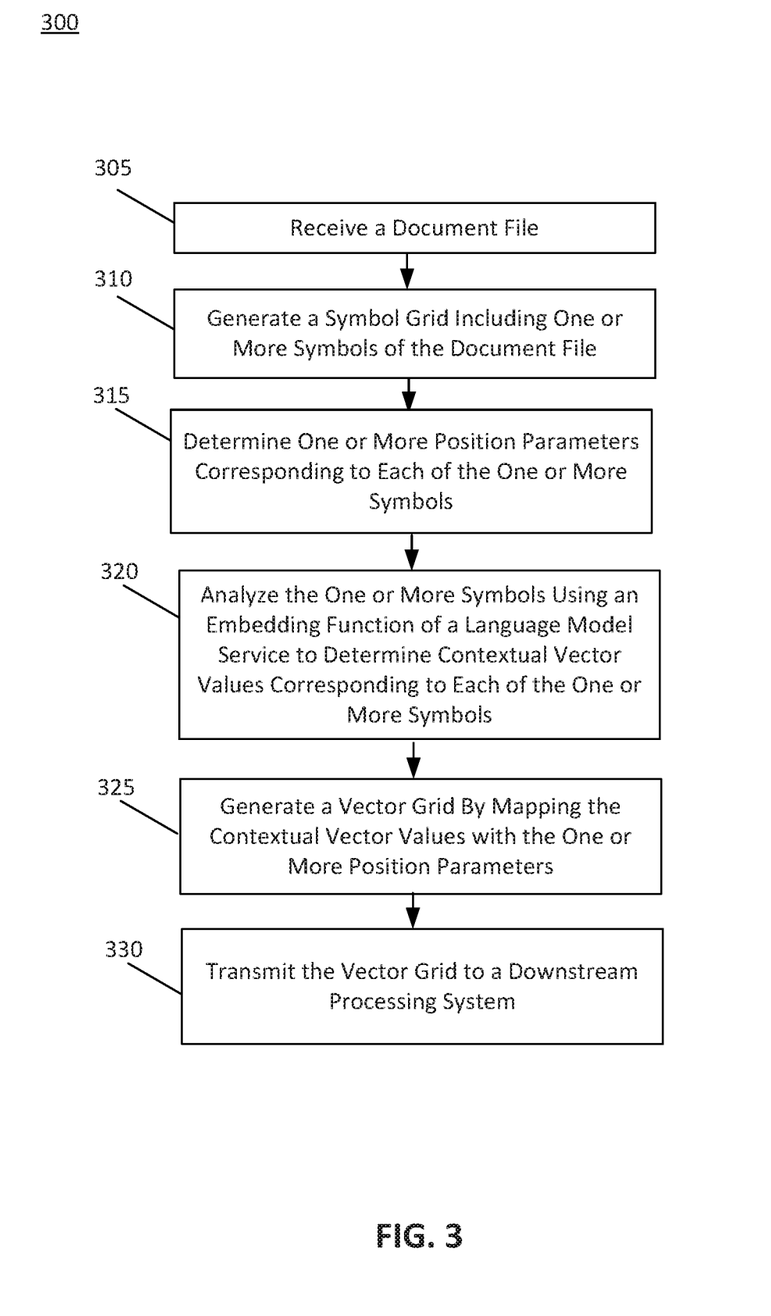
FIG. 3 depicts a flowchart illustrating a method for generating a vector grid, according to some embodiments.

FIG. 3 depicts a flowchart illustrating a method 300 for generating a vector grid, according to some embodiments. Method 300 shall be described with reference to FIG. 1A, FIG. 1B, FIG. 2; however, method 300 is not limited to that example embodiment.

In an embodiment, a language model system 110 may analyze document 120 to generate vector grid 220. Document 120 may include handwritten and/or typewritten text. Method 300 may generate vector grid 220 for use with a downstream processing system 140. While method 300 is described with reference to language model system 110, method 300 may be executed on any computing device, such as, for example, the computer system described with reference to FIG. 4 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

At 305, language model system 110 may receive a document file. The document file may be document 120. The document file may be a document data file and/or may be an image of a document. Language model system 110 may access the document file from a storage location in a computer memory and/or may receive the document file from an external computer system. The document file may be a text, document, and/or image data file. The document file may include handwritten and/or typewritten text. The document file may be a scanned document, a PDF document, a photograph, and/or an image of a document. In some embodiments, the document file may refer to a data file containing formatted text such as, for example, HTML, Word text, plain text, formatted text, and/or other text data files.

At 310, language model system 110 may generate a symbol grid 210 including one or more symbols of the document file. To generate symbol grid 210, language model system 110 may apply optical character recognition (OCR) service 112. OCR service 112 may provide mappings for the characters detected in an image of a document to numerical index values. OCR service 112 may perform pixel analysis to determine these character values. In some embodiments, OCR service 112 may identify symbols as groupings of characters. For example, a symbol may be a word, phrase, sentence, paragraph, or other organization of characters. OCR service 112 may identify symbols from one or more languages. In some languages, characters may be specified as a symbol, such as, for example, Chinese. Language model system 110 may identify these symbols to generate a symbol grid 210 of the document image.

In an embodiment where the document file is a textual data file, such as for example, a HTML, Word text, plain text, formatted text, and/or other text data file, language model system 110 may generate symbol grid 210 without applying an OCR process. Language model system 110 may extract the symbol values and/or corresponding position values from the document file using a file reader and/or a file converter. Language model system 110 may then generate symbol grid 210 using these values. In this manner, language model system 110 may avoid using OCR service 112.

At 315, language model system 110 may determine one or more position parameters corresponding to each of the one or more symbols of symbol grid 210. If the document file has a two-dimensional layout, the one or more position parameters may be horizontal and vertical coordinates of the symbol. For example, the coordinate may be represented by an (x, y) value. These values may be absolute or relative coordinates. For example, the coordinates may be based on positions in the symbol grid 210. In some embodiments, determining the one or more position parameters may occur while generating symbol grid 210. For example, as the symbol grid 210 is applied to each symbol and/or as symbol values are identified, language model system 110 may also identify the position parameters.

At 320, language model system 110 may analyze the one or more symbols using an embedding function of language model service 116 to determine contextual vector values corresponding to each of the one or more symbols. The embedding function may have been previously trained to identify coefficients for a neural network. The embedding function may use as inputs a particular symbol, the position parameters of the symbol, and/or the contextual symbols neighboring the symbol. Using these values, the embedding function may generate a contextual vector value for a particular symbol. Language model system 110 may apply the embedding function to each symbol to determine corresponding contextual vector values.

By incorporating the contextual symbol information, language model system 110 may provide additional details to downstream document analysis processes. For example, language model system 110 may differentiate between different semantic meanings for the same symbol or word. In some embodiments, different magnitudes of contextual information may be incorporated into the embedding function. For example, a particular radius of neighboring symbols may be identified, such as a number of symbols. The embedding function may be configured to use the symbols in the radius to aid in identifying the contextual vector value.

In some embodiments, the embedding function may be generated using the previously described BERT language model. The BERT model may use a serialization technique to analyze symbol grid 210. In this case, language model system 110 may convert the symbols into a one-dimensional sequence with the contextual information to allow the BERT model to perform the analysis to generate the contextual vector values.

At 325, language model system 110 may generate a vector grid 220 by mapping the contextual vector values with the one or more position parameters. Vector grid 220 may represent a grid of vectors organized into a structure based on the positions of the original symbol grid. In some embodiments, the structure may be two-dimensional like the document file and/or image of the document and may provide additional information to downstream processing systems. Vector grid 220 may provide two-dimensional layout information corresponding to the document file and/or image of the document. In some embodiments, downstream processing system 140 may use this two-dimensional layout information to perform document processing based on expected document layouts.

At 330, language model system 110 may transmit the vector grid 220 to a downstream processing system 140. Downstream processing system 140 may transmit vector grid 220 via a wired and/or wireless communication medium to an external downstream processing system 140. Downstream processing system 140 may perform additional tasks using vector grid 220 to analyze the document file. For example, downstream processing system 140 may extract semantic meaning, perform document classification, and/or identify portions of the document file and/or image of the document relevant to the downstream task.

In some embodiments, language model system 110 may perform the downstream task rather than transmitting vector grid 220 to a separate external system. For example, a computer system implementing language model system 110 may also implement downstream processing system 140.

Figure 4:
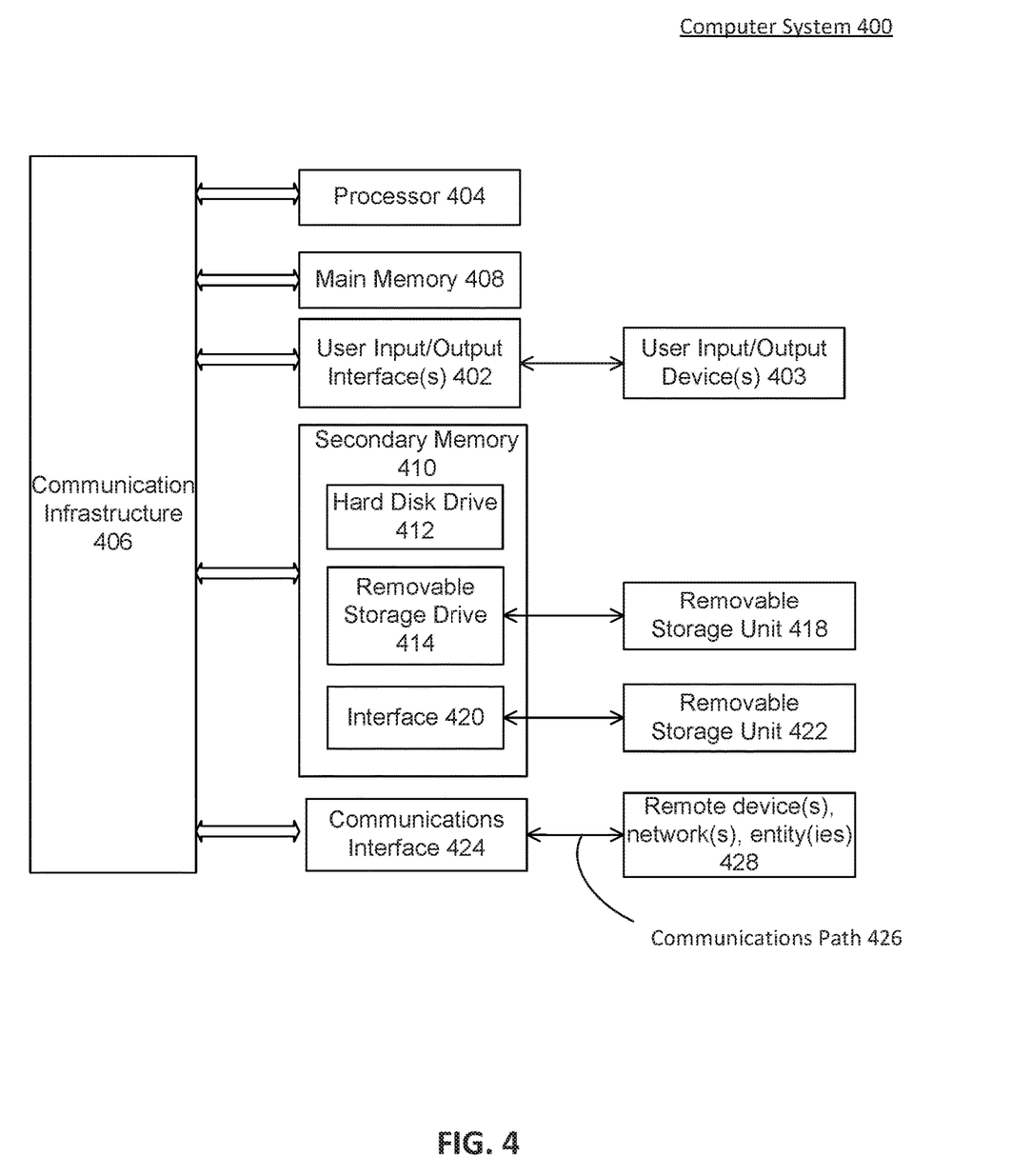
FIG. 4 depicts an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include; for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot; and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (AWL), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
    receiving a document file;
    generating a symbol grid including one or more symbols of the document file;
    determining one or more position parameters corresponding to each of the one or more symbols;
    analyzing the one or more symbols using an embedding function and one or more neighboring symbols to determine contextual vector values corresponding to each of the one or more symbols, wherein each of the contextual vector values represents respective semantic meanings for each of the one or more symbols based on the one or more neighboring symbols; and
    generating a vector grid by mapping the contextual vector values with the one or more position parameters.

2. The computer implemented method of claim 1, wherein the embedding function uses a neural network language model.

3. The computer implemented method of claim 1, wherein the embedding function uses a Bidirectional Encoder Representations from Transformers (BERT) model.

4. The computer implemented method of claim 1, wherein the document file is an image of a document and the vector grid provides two-dimensional layout information of the image of the document.

5. The computer implemented method of claim 1, wherein the analyzing further comprises:
    identifying a radius of neighboring symbols; and
    selecting the one or more neighboring symbols within the radius.

6. The computer implemented method of claim 1, wherein the symbol grid includes a first symbol and a second symbol having a common symbol value and wherein a first contextual vector value corresponding to the first symbol differs from a second contextual vector value corresponding to the second symbol.

7. The computer implemented method of claim 1, further comprising:
    performing a key value extraction from the document file using the vector grid.

8. A system, comprising:
    a memory; and
    at least one processor coupled to the memory and configured to:
        receive a document file;
        generate a symbol grid including one or more symbols of the document file;
        determine one or more position parameters corresponding to each of the one or more symbols;
        analyze the one or more symbols using an embedding function and one or more neighboring symbols to determine contextual vector values corresponding to each of the one or more symbols, wherein each of the contextual vector values represents respective semantic meanings for each of the one or more symbols based on the one or more neighboring symbols; and
        generate a vector grid by mapping the contextual vector values with the one or more position parameters.

9. The system of claim 8, wherein the embedding function uses a neural network language model.

10. The system of claim 8, wherein the embedding function uses a Bidirectional Encoder Representations from Transformers (BERT) model.

11. The system of claim 8, wherein the document file is an image of a document and the vector grid provides two-dimensional layout information of the image of the document.

12. The system of claim 8, wherein to analyze the one or more symbols, the at least one processor is further configured to:
    identify a radius of neighboring symbols; and
    select the one or more neighboring symbols within the radius.

13. The system of claim 8, wherein the symbol grid includes a first symbol and a second symbol having a common symbol value and wherein a first contextual vector value corresponding to the first symbol differs from a second contextual vector value corresponding to the second symbol.

14. The system of claim 8, wherein the at least one processor is further configured to:
    perform a key value extraction from the document file using the vector grid.

15. A non-transitory computer-readable device having instructions stored thereon that, when executed by at least one computing device, cause the at least one computing device to perform operations comprising:
    receiving a document file;
    generating a symbol grid including one or more symbols of the document file;
    determining one or more position parameters corresponding to each of the one or more symbols;

analyzing the one or more symbols using an embedding function and one or more neighboring symbols to determine contextual vector values corresponding to each of the one or more symbols, wherein each of the contextual vector values represents respective semantic meanings for each of the one or more symbols based on the one or more neighboring symbols; and generating a vector grid by mapping the contextual vector values with the one or more position parameters.

16. The non-transitory computer-readable device of claim 15, wherein the embedding function uses a neural network language model.

17. The non-transitory computer-readable device of claim 15, wherein the embedding function uses a Bidirectional Encoder Representations from Transformers (BERT) model.

18. The non-transitory computer-readable device of claim 15, wherein the document file is an image of a document and the vector grid provides two-dimensional layout information of the image of the document.

19. The non-transitory computer-readable device of claim 15, wherein analyzing the one or more symbols further comprises:

identifying a radius of neighboring symbols; and selecting the one or more neighboring symbols within the radius.

20. The non-transitory computer-readable device of claim 15, wherein the symbol grid includes a first symbol and a second symbol having a common symbol value and wherein a first contextual vector value corresponding to the first symbol differs from a second contextual vector value corresponding to the second symbol.

* * * * *